R. MACDONALD.
Molds for Oil-Cakes.
No. 144,400.  Patented Nov. 11, 1873.
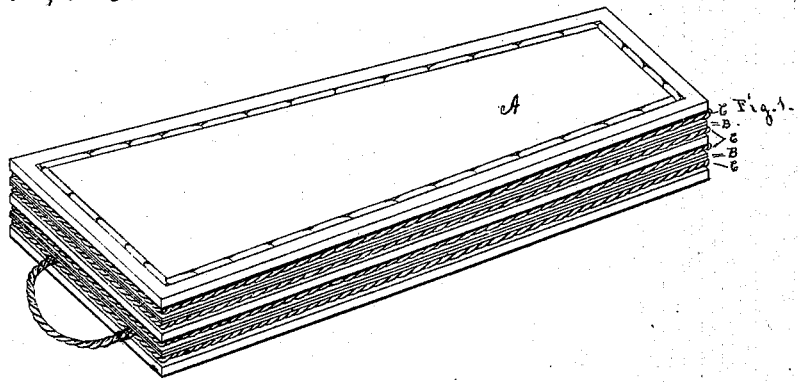
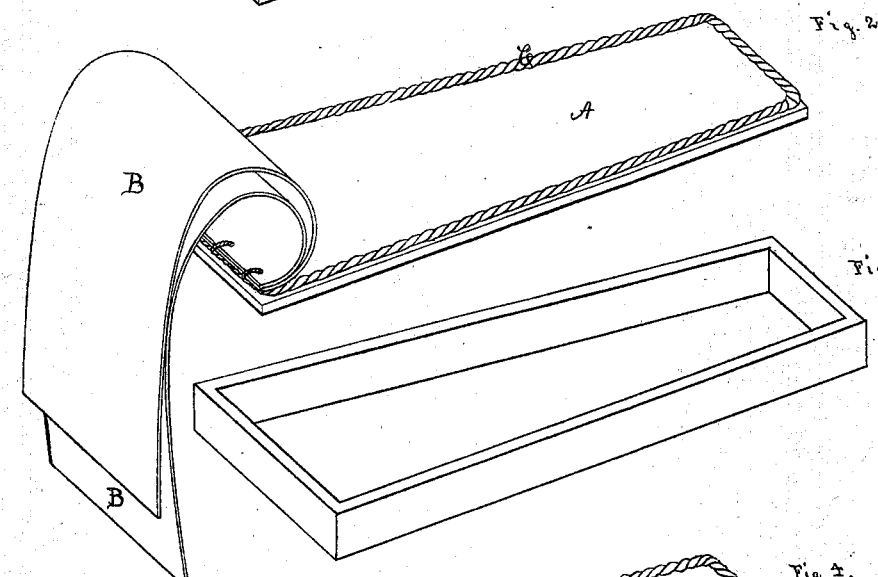
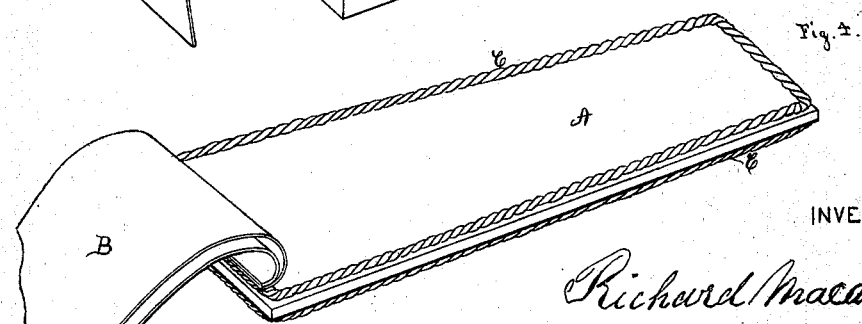
INVENTOR
Richard Macdonald
WITNESSES.

UNITED STATES PATENT OFFICE.

RICHARD MACDONALD, OF HULL, ENGLAND.

IMPROVEMENT IN MOLDS FOR OIL-CAKES.

Specification forming part of Letters Patent No. 144,400, dated November 11, 1873; application filed October 29, 1872.

*To all whom it may concern:*

Be it known that I, RICHARD MACDONALD, of the city of Hull, York county, England, have invented a new, useful, and Improved Mold for Oil-Cake; and I hereby declare the following to be a full, clear, and exact description of my invention, reference being had to the accompanying illustrative drawing and to the letters of reference thereon, making a part of this specification.

My improvement consists of a novel and peculiarly-constructed series of molds, which, when filled with the finely-crushed or ground seed, and combined as in the practice of the invention, and when subjected to the action of the hydraulic press, as hereinafter described, constitute an effectual means by which the oil existing in the said ground or crushed seed may be completely extracted therefrom, and the quality of the residuum or cake remaining thereafter will be materially improved thereby.

My improvement is simple, of easy construction, application, and operation, as will be more readily understood and appreciated by an examination of the drawing annexed, whereon all that I claim as new is clearly shown, and whereon the similar letters of reference indicate corresponding parts of the device.

Figure 1 is a perspective view of the series of molds, which, when filled with the crushed or ground seed and combined as a whole, is ready to be subjected to the action of the hydraulic press. Fig. 2 shows the bottom mold of the series, and in connection therewith are likewise shown the canvas laps, together with the twisted or braided hair or grass-rope borders or flanges, all of which, as hereinafter explained, serve important purposes in the practice of the invention. Fig. 3 shows the "former," which is used only in the construction of the ground or crushed seed into the proper form upon or within the molds in its preparation for the press. Fig. 4 shows the intermediate or middle mold-plate of the series, provided also with the canvas laps and hair or grass-rope flanges mentioned in the allusion to Fig. 2.

The plates which constitute the bottom or top of the several molds, according as they are used upright or inverted in the combination, are constructed of metal, usually iron. The plates are shown at A in Figs. 1, 2, and 4.

The canvas laps are shown in the same figures at B, while also are shown in the same figures the twisted-hair or grass-rope flanges C. The office of the canvas laps is to separate the pressed cakes from the plates A, and to facilitate their removal therefrom, while the hair or grass-rope flanges C admit of the free exit of the oil existing in the crushed or ground seed when the same is subjected to pressure. These laps B B are made in the form of an apron, and are constructed, as before stated, of canvas, either wool or cotton. The great advantage of thus constructing the laps of canvas is found in the fact that the pressed cake does not stick thereto, but is readily removed therefrom after the same has been molded.

I am aware that metal and leather aprons have been tried; but their use has invariably proved impracticable, owing to the fact that the pressed cake adheres so tenaciously thereto that it can only with the greatest difficulty be removed. I am also aware that canvas sacks have been used; but these are also objectionable, owing to the difficulty of removing the pressed cake without breaking off its corners, and which greatly injures its market value. Practical experience has demonstrated the fact that, apart from the great advantage in saving labor and time which the canvas apron has over the sack, while with the sack the corners of the cake are invariably broken, with the apron not one in a hundred is so injured.

The operation of preparing and filling the several molds with the crushed seed and combining them for the press will now be explained. Take, for instance, the bottom mold, which is shown at Fig. 2; and having placed one of the canvas laps thereto attached, and shown at B, upon the bottom and rope flanges thereof, and upon the said canvas lap having placed the former shown at Fig. 3, fill the same with the crushed or ground seed closely packed, whereupon remove the said former and cover the already partially-formed cake with the second canvas lap thereon shown, and upon this last layer of canvas place the mold shown at Fig. 4, and with this mold bring into requisition the former for a second cake, to be made in the same manner as described for the bottom cake; and, lastly, the mold with hair or grass-rope flange, but without the canvas laps, is inverted and placed upon the "pile" to complete the series. This mold is shown at the top of Fig. 1, wherein, as before stated, is shown the mold as filled and ready for the press.

I have demonstrated by actual and repeated experiments that my improvement obtains more oil from the crushed seed, and consequently produces a better quality of residuum, than has ever been obtained or produced by any of the molds as constructed and in general use at the present time; hence my invention becomes of great utility, not only to the manufacturers of seed-oils and oil-seed cake, but to the public in general.

Having described my invention, what I claim as new, and desire to secure by Letters Patent, is the following:

1. The mold A, constructed as described, with rope flanges C, as and for the purpose specified.

2. In combination with an oil-cake mold, constructed as described, the canvas laps B B, as and for the purpose specified.

RICHARD MACDONALD.

Witnesses:
H. N. JENKINS,
L. J. OLMSTEAD.